US008589351B2

(12) United States Patent
Sugahara (10) Patent No.: US 8,589,351 B2
(45) Date of Patent: Nov. 19, 2013

(54) COMPUTER PROGRAM PRODUCT AND DATA BACKUP METHOD

(75) Inventor: Noriaki Sugahara, Nagoya (JP)

(73) Assignee: Buffalo Inc., Nagoya (JP)

( * ) Notice: Subject to any disclaimer, the term of this patent is extended or adjusted under 35 U.S.C. 154(b) by 61 days.

(21) Appl. No.: 13/022,521

(22) Filed: Feb. 7, 2011

(65) Prior Publication Data

US 2011/0202505 A1 Aug. 18, 2011

(30) Foreign Application Priority Data

Feb. 12, 2010 (JP) .................................. 2010-28680

(51) Int. Cl.
*G06F 17/00* (2006.01)
*G06F 7/00* (2006.01)

(52) U.S. Cl.
USPC ............ 707/640; 707/654; 711/161; 711/162

(58) Field of Classification Search
None
See application file for complete search history.

(56) References Cited

U.S. PATENT DOCUMENTS

| 6,332,147 | B1 * | 12/2001 | Moran et al. ................... 715/203 |
| 2006/0204120 | A1 * | 9/2006 | Poon et al. ................... 382/254 |
| 2007/0162271 | A1 * | 7/2007 | Brunet et al. ................... 703/25 |
| 2007/0225962 | A1 * | 9/2007 | Brunet et al. ................... 703/23 |
| 2008/0034307 | A1 * | 2/2008 | Cisler et al. ................... 715/764 |
| 2008/0239098 | A1 * | 10/2008 | Suzuki ................... 348/231.99 |
| 2010/0274816 | A1 * | 10/2010 | Guzik ................... 707/802 |
| 2011/0047128 | A1 * | 2/2011 | Brunet et al. ................... 707/654 |

FOREIGN PATENT DOCUMENTS

| CN | 1846197 | 10/2006 |
| CN | 1972427 | 5/2007 |
| CN | 101321187 | 12/2008 |
| JP | 2009-205548 | 9/2009 |

OTHER PUBLICATIONS

English translation only of Chinese Office Action dated Aug. 30, 2012 from Chinese Application No. 201110034517.9—as an explanation of relevance.

* cited by examiner

*Primary Examiner* — Angelica Ruiz
(74) *Attorney, Agent, or Firm* — Beyer Law Group LLP (57) ABSTRACT

Provided is a computer program product for backing up data, which are stored in a first storage device connected with a computer, into a second storage device connected with the computer. The computer program product includes: a computer-readable medium; and a computer program code stored on the computer-readable medium, wherein the computer program code includes: a program code for generating backup data based on at least part of the data stored in the first storage device; a program code for obtaining, as identification data, at least one of image data and sound data provided by a separate program code that is different from the computer program and is executed during the generation of the backup data; and a program code for correlating the generated backup data to the obtained identification data and storing the backup data correlated to the identification data into the second storage device.

9 Claims, 5 Drawing Sheets

COMPUTER PROGRAM PRODUCT AND DATA BACKUP METHOD

CROSS-REFERENCE TO RELATED APPLICATIONS

The present application claims the priority based on Japanese Patent Applications No. 2010-28680 filed on Feb. 12, 2010, the disclosures of which are hereby incorporated by reference in their entireties.

BACKGROUND OF THE INVENTION

1. Field of the Invention

The present invention relates to backup of data in a computer.

2. Description of the Related Art

In order to provide against the potential failure of the internal hard disk drive of a personal computer or an external hard disk drive or the potential falsification of data by computer viruses, data backup has conventionally been performed to copy data stored in the hard disk drive and store the copied data as backup data in a different storage medium, for example, another hard disk, a CD-RW (Compact Disk Rewritable), or a DLT (Digital Linear Tape) (Japanese Patent Laid-Open No. 2009-205548). In general, the data backup technique does not overwrite the existing backup data but adds new backup data in the storage medium every time the data backup is performed. This provides multiple restore points.

With a view to enhancing the discrimination of each piece of backup data among the multiple backup data, one proposed technique stores backup data in correlation with information on the date and time when the backup was executed. For the same purpose, another proposed technique uses a backup user interface allowing for the user's entry of any arbitrary character sequence and stores backup data in correlation with the user's entered character sequence via the user interface.

The proposed technique of storing the backup data in correlation with the information on the date and time of backup utilizes only the date and the time as clue information for selection of backup data used for data restoration. There is accordingly a possibility that the user mistakenly selects unsuitable backup data to be used for data restoration. It undesirably takes a long time for the user to select desired backup data.

In the proposed technique of storing the backup data in correlation with the user's entered character string, there is a possibility that each backup data is not readily identifiable by the user's entered character string, due to the restricted number of input characters or the user's insufficient skill. In such cases, the user may not select satisfactory backup data used for data restoration by referring to the character string. This problem is not limited to the personal computer but may be found in any computer, such as a cell-phone or a PDA (Personal Digital Assistant).

SUMMARY

By taking into account the problem mentioned above, there is a need to enhance the discrimination of each piece of backup data in a computer capable of obtaining multiple backup data.

In order to solve the problem mentioned above, the present invention provides various embodiments and applications described below.

According to an aspect of the present invention, there is provided a computer program product for backing up data, which are stored in a first storage device connected with a computer, into a second storage device connected with the computer. The computer program product includes: a computer-readable medium; and a computer program code stored on the computer-readable medium, wherein the computer program code includes: a program code for generating backup data, based on at least part of the data stored in the first storage device; a program code for obtaining, as identification data, at least one of image data and sound data provided by a separate program code that is different from the computer program code and is executed during the generation of the backup data; and a program code for correlating the generated backup data to the obtained identification data and storing the backup data correlated to the identification data into the second storage device.

The computer program product according to this aspect of the invention correlates the backup data to the identification data and stores the backup data correlated to the identification data into the second storage device. This arrangement utilizes the image or the sound represented by the identification data to enhance the discrimination of the backup data. The term 'computer' in this aspect is used in a broad sense and includes, for example, a personal computer, a cell-phone, or a PDA (personal digital assistant).

In one application of the computer program product according to the above aspect of the invention, the computer program code further includes: a program code for providing a user interface to select backup data used for data restoration, among multiple backup data generated at different times and stored in the second storage device; and a program code for reproducing one of the image data and the sound data based on the identification data correlated to the backup data selected via the user interface.

The computer program product of this embodiment reproduces one of the image and the sound provided on the computer during the generation of the backup data. The embodiment enables the user to readily recall the 'program being executed in the computer' or the 'operation being performed in the computer' during the generation of the selected backup data. This arrangement thus effectively prevents the user from mistakenly selecting unsuitable backup data used for data restoration or from spending a long time for selection of the backup data.

In another application of the computer program product according to the above aspect of the invention, the computer is connected with a monitor device, the separate program code is executed to display a screen image on the monitor device, and the identification data is screen image data representing the screen image displayed on the monitor device, when the backup data is generated in the computer.

The computer program product of this embodiment provides the visual display, which enables the user to readily recall the 'program being executed in the computer' or the 'operation being performed by the user in the computer' during the generation of the backup data selected via the user interface.

In still another application of the computer program product according to the above aspect of the invention, the computer program code further includes: a program code for generating a thumbnail image of the screen image based on the screen image data; and a program code for displaying the generated thumbnail image as part of the user interface on the monitor device, wherein the screen image data correlated to the backup data is selected via the user interface.

The computer program product of this embodiment causes a thumbnail image of the screen image displayed on the monitor device during the acquisition of the backup data to be displayed on the user interface. The user can thus select the desired backup data used for data restoration, while referring to the display of the thumbnail images. This arrangement thus effectively prevents the user from mistakenly selecting unsuitable backup data used for data restoration or prevents a long time from being consumed for the selection of the backup data.

According to still another aspect, the invention is further directed to a method of backing up data that are stored in a first storage device connected with a computer, into a second storage device connected with the computer. The method includes the steps of: generating backup data, based on at least part of the data stored in the first storage device; obtaining, as identification data, at least one of image data and sound data provided by a program code executed by the computer during the generation of the backup data; and correlating the generated backup data to the obtained identification data and storing the backup data correlated to the identification data into the second storage device.

The backup method according to this aspect of the invention correlates the backup data to the identification data and stores the backup data correlated to the identification data into the second storage device. This arrangement utilizes the image or the sound represented by the identification data to enhance the discrimination of the backup data. The term 'computer' in this aspect is used in a broad sense and includes, for example, a personal computer, a cell-phone, or a PDA (personal digital assistant).

DETAILED DESCRIPTION OF EMBODIMENT

A1. System Configuration

Figure 1:
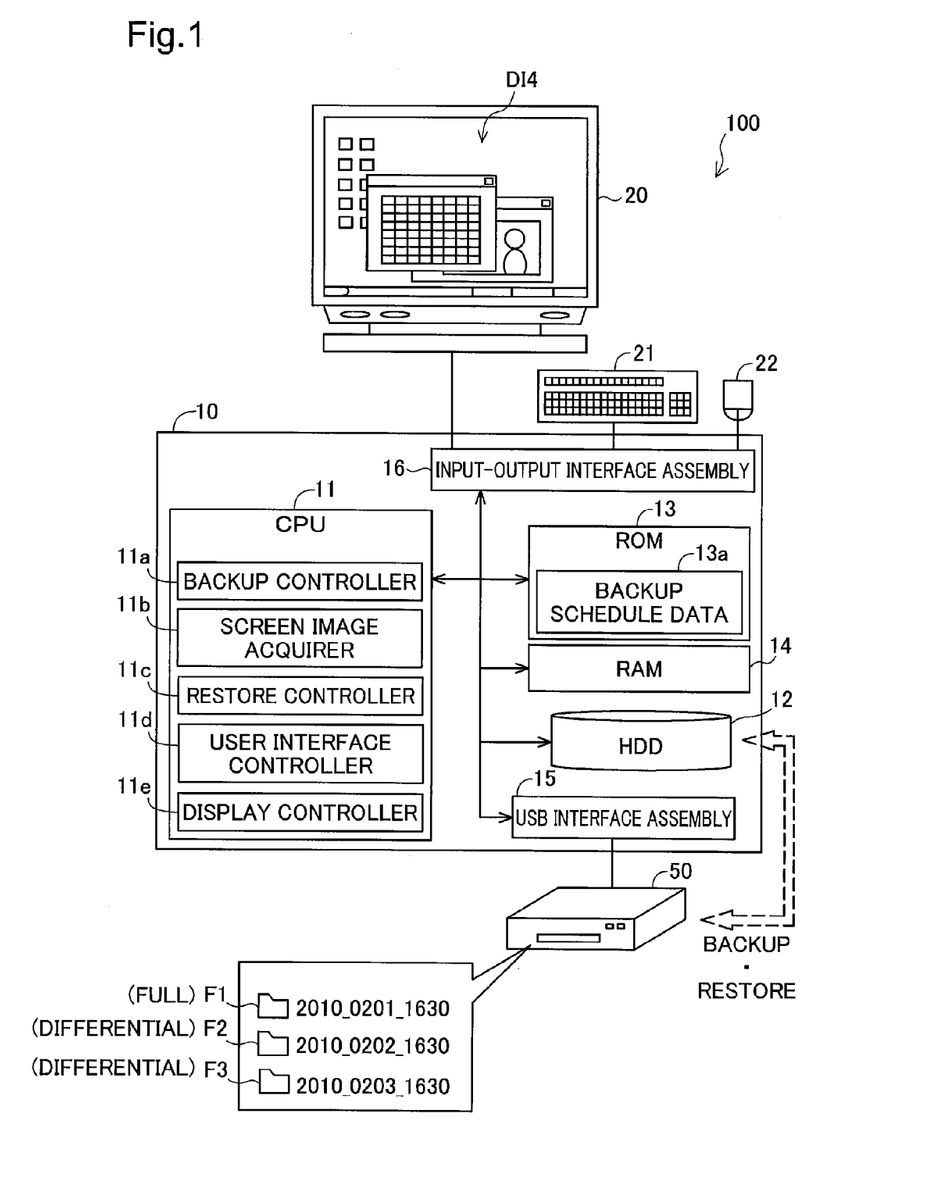
FIG. 1 illustrates the configuration of a computer system according to one embodiment of the invention.

FIG. 1 illustrates the configuration of a computer system 100 according to one embodiment of the invention. The computer system 100 includes a personal computer 10, a display 20, a keyboard 21, a mouse 22, and an external hard disk drive 50.

The personal computer 10 includes a CPU (Central Processing Unit) 11, a hard disk drive (HDD) 12, a RAM (Random Access Memory) 14, a ROM (Read Only Memory) 13, a USB (Universal Serial Bus) interface assembly 15, and an input-output interface assembly 16.

The HDD 12 stores various application programs including an image editing program and a backup program and various application data, such as image data and mail data. The RAM 14 is used as a work area, on which the application programs are loaded and executed. The ROM 13 is an EEPROM (Electrically Erasable and Programmable Read Only Memory) and stores various setting data used for execution of the application programs. In the illustrated example of FIG. 1, backup schedule data 13a is stored in the ROM 13.

The backup schedule data 13a is structured to include various settings with regard to a backup process (described later in detail) such as, for example, the execution timings of the backup process and backup objects. The backup schedule data 13a is set in advance by the administrator of the computer system 100 and is stored in the ROM 13. In this embodiment, the execution timing of the backup process may be set to, for example, 16:30 every day. The backup process may be set to fully backup all the data in preset paths (full backup) on the first day of each month and to backup only differential data from a previous backup (differential backup) on each of the other days in the month. The term 'differential data' represents a difference from a previous backup.

The USB interface assembly 15 is a functional block having an interface for USB connection with peripheral equipment and one or more USB ports (physical ports) and interpreting USB protocols. The input-output interface assembly 16 is a functional block having interfaces for respectively connecting the display 20, the keyboard 21, and the mouse 22 with the personal computer 10.

Various application programs and device drivers stored in the HDD 12 are executed under the operating system in the personal computer 10. The CPU 11 executes a backup program (not shown) having the functions of a backup controller 11a, a screen image acquirer 11b, a restore controller 11c, and a user interface controller 11d. The CPU 11 also executes a device driver for the display 20 having the functions of a display controller 11e.

The backup controller 11a is a functional block controlling the process of backing up the data stored in the HDD 12. The screen image acquirer 11b is a functional block capturing a screen image displayed on the display 20. The restore controller 11c is a functional block controlling a data restore process (described later in detail) based on backup data. The user interface controller 11d is a functional block displaying a restore operation window (discussed later) and interpreting the user's instructions entered via the restore operation window. The display controller 11e controls image display on the display 20.

The display 20 displays screen images provided by the operating system and various application windows. Any monitor device, for example, a liquid crystal display or a CRT (Cathode Ray Tube) display, may be used for the display 20. In the state illustrated in FIG. 1, the screen image DI4 displayed on the display 20 includes multiple application windows and multiple folder icons. This screen image DI4 is created as a composite image by the operating system by combining individual images generated by the operating system and the respective application programs. The screen image DI4 generated in the personal computer 10 is written in a VRAM (Video Random Access Memory) (not shown) by the operating system, while being read out from the VRAM and sent to the display 20 by the display controller 11e.

The external hard disk drive 50 serves as a storage device used for storing backup data and has a USB interface (not shown) as an external interface. The external hard disk drive 50 is connected to the personal computer 10 (specifically to the USB interface assembly 15 thereof) via the USB interface. In the state illustrated in FIG. 1, three folders F1, F2, and F3 for storing backup data are stored in the external hard disk drive 50. A unique name for specifying the execution date and time of backup is given to each of the folders F1 through F3.

To be precise, a unique name '2010_0201_1630' representing 16:30, Feb. 1, 2010 is assigned to the folder F1. Similarly, a unique name '2010_0202_1630' representing 16:30, Feb. 2, 2010 is assigned to the folder F2, and a unique name '2010_0203_1630' representing 16:30, Feb. 3, 2010 is assigned to the folder F3.

The computer system 100 structured as described above performs the backup process and the data restore process to enhance the discrimination of respective backup data and enables the user to readily identify and select needed backup data.

The HDD 12 described above corresponds to the first storage device appearing in the claim 1 of this specification. Further, the hard disk drive 50, the device driver for the display 20, and the image data of the screen image on the desk top displayed on the display 20 correspond respectively to the second storage device, the separate program code and the identification data, all appearing in the claim 1 of the specification.

A2. Backup Process

Figure 2:
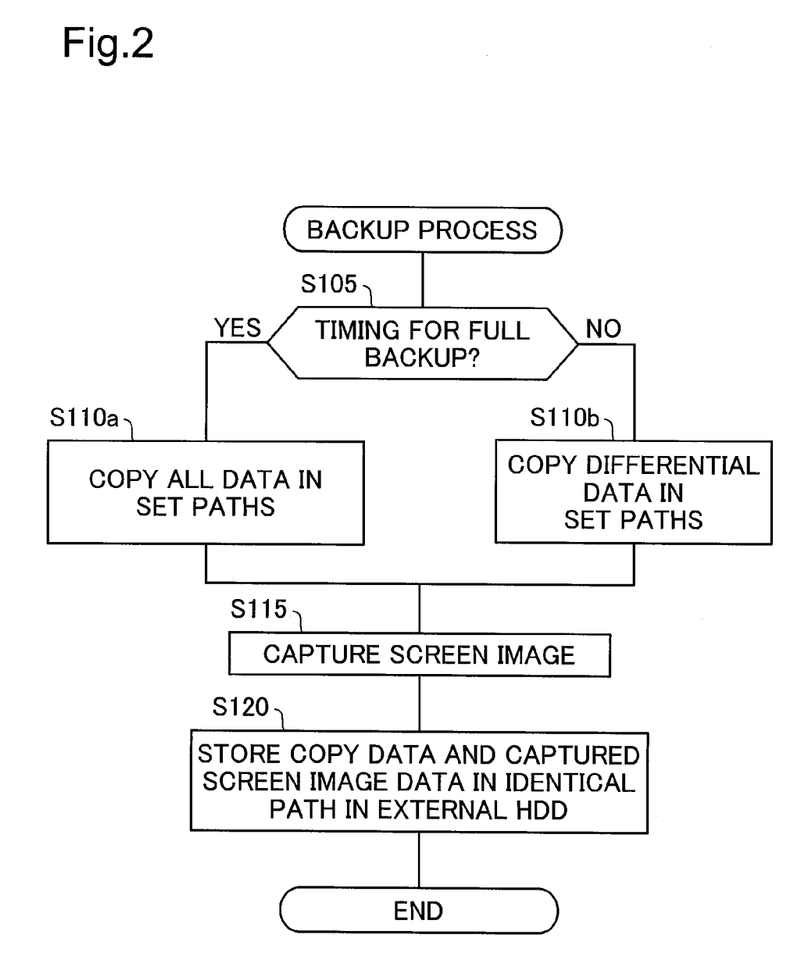
FIG. 2 is the flowchart of the backup process performed in the computer system.

FIG. 2 is a flowchart showing the backup process performed in the computer system 100. In the computer system 100, the backup process automatically starts at 16:30 every day according to the backup schedule 13a shown in FIG. 1. The backup process is explained in detail below with reference to one example where the current cycle of the backup process is performed at 16:30, Feb. 4, 2010 in the state that the screen image DI4 is displayed on the display 20 as shown in FIG. 1. The backup process is executed as a background process in the personal computer 10.

The backup controller 11a reads the contents of the backup schedule data 13a and checks whether this backup timing is a timing for the full backup (step S105). As explained previously, in this embodiment, the backup schedule data 13a is set to perform the full backup on the first day of each month. The backup controller 11a refers to the current date and time set on the personal computer 10 (specifically the operating system) and checks whether the current date is the first day of a month. This determines that this timing is the timing for the full backup.

If this timing is the timing for the full backup (step S105: Yes), the backup controller 11a copies all the data stored in paths set as backup objects in the backup schedule data 13a and stores the copied data into the RAM 14 (step S110a).

If this timing is not the timing for the full backup (step S105: No), on the other hand, the backup controller 11a copies only the differential data from the data obtained in a previous cycle of the backup process and stores the copied differential data into the RAM 14 (step S110b). Since the backup process is performed on Feb. 4, 2010 in this example, the processing of step S110b is performed to obtain the differential copy data. The differential copy data may be obtained according to the following procedure. The backup controller 11a reads the backup data obtained in a previous cycle of the backup process from the external hard disk drive 50, compares the read backup data with paths and files currently stored in the HDD 12, and extracts any updated paths and files and any deleted paths and files based on the data volume and the updated date and time. The backup controller 11a stores the updated paths and files as changed data and the deleted paths and files as deleted data, into the RAM 14.

After the completion of either the processing of step S110a or the processing of step S110b, the backup controller 11a controls the screen image acquirer 11b to acquire or capture the screen image currently displayed on the display 20 and store the data of the captured screen image into the RAM 14 (step S115). In this embodiment, the desktop screen image is captured as the currently displayed screen image. The screen image acquirer 11b may copy the image data stored in the VRAM (not shown) to capture the screen image displayed on the display 20.

The backup controller 11a sends the backup data (the full backup data or the differential backup data) and the screen image data stored in the RAM 14 to the external hard disk drive 50 via the USB interface assembly 15, and causes the backup data in correlation with the screen image data to be stored in one identical path or one identical folder in the external hard disk drive 50 (step S120). The backup controller 11a newly generates a folder or a path as a new storage area and assigns the execution year, month, date, and time of backup as a unique name to the newly generated folder or path.

Figure 3:
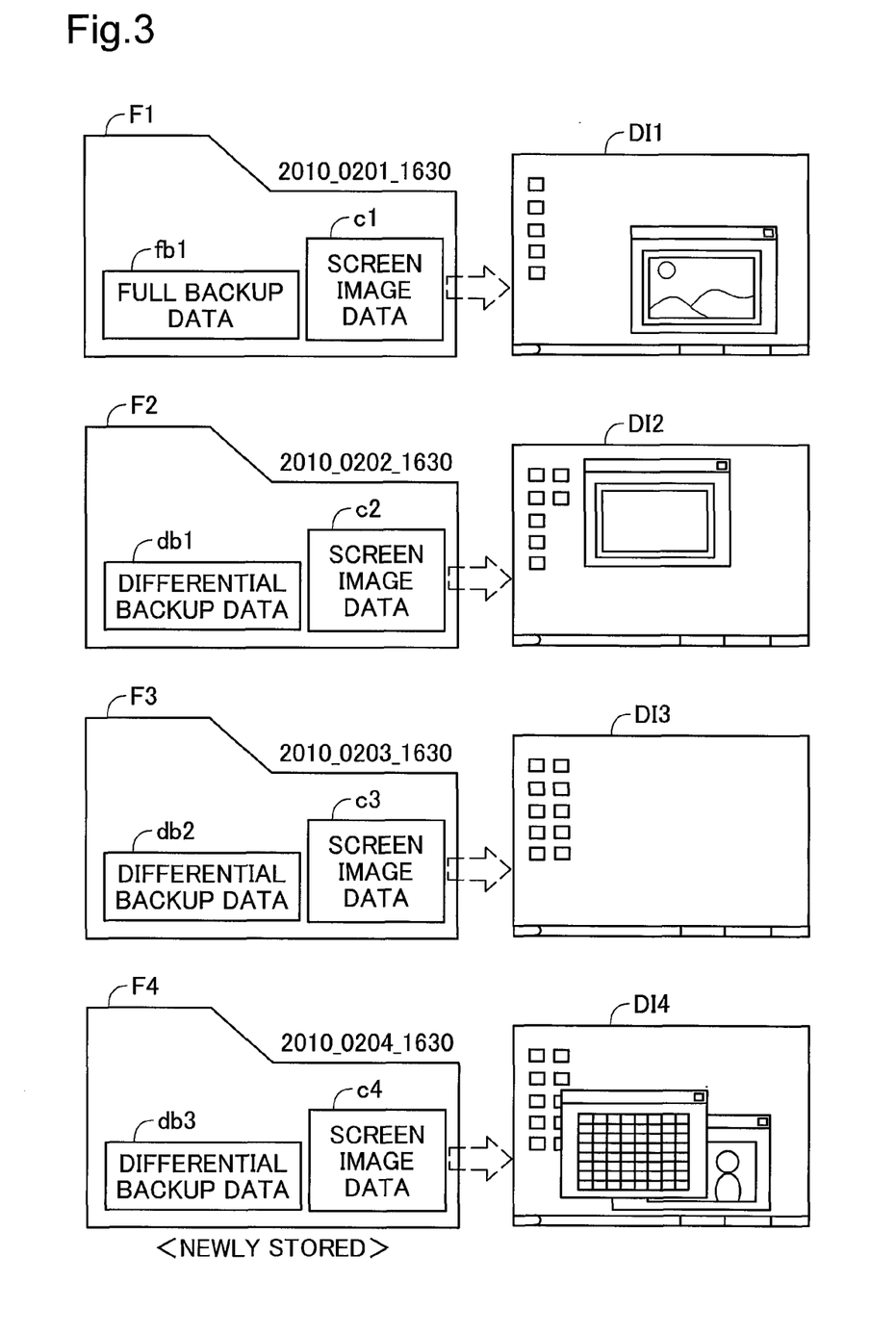
FIG. 3 illustrates one example of data stored in the external hard disk drive after the execution of the current cycle of the backup process.

FIG. 3 illustrates one example of data stored in the external hard disk drive 50 after the execution of the current cycle of the backup process. The left half of FIG. 3 shows data stored in the external hard disk drive 50 by the backup process (hereafter referred to as backup-time obtained data'). The right half of FIG. 3 shows screen images represented by screen image data stored in respective folders. Folders F1 through F3 shown in FIG. 3 are identical with the folders F1 through F3 shown in FIG. 1.

As a result of the current cycle of the backup process performed on Feb. 4, 2010, a folder F4 with a unique name '2010_0204_1630' is newly stored in the external hard disk drive 50 as shown in FIG. 3. This folder F4 stores differential backup data db3 and screen image data c4 as the backup-time obtained data. The screen image DI4 represented by the screen image data c4 is identical with the screen image DI4 displayed on the display 20 in the state of FIG. 1.

Each of the other folders F1 through F3 also stores backup data and screen image data as backup-time obtained data. Specifically, the folder F1 stores full backup data fb1 and screen image data c1. The storage in the folder F1 includes the full backup data fb1 since the execution date of the backup process to generate the folder F1 is the first day of a month (Feb. 1, 2010). The folder F2 stores differential backup data db1 and screen image data c2, and the folder F3 stores differential backup data db2 and screen image data c3.

The screen image DI1 represented by the screen image data c1 denotes a screen image displayed on the display 20 at the date and time when the full backup data fb1 was obtained (16:30, Feb. 1, 2010). Similarly, the screen image DI2 represented by the screen image data c2 denotes a screen image displayed on the display 20 at the date and time when the differential backup data db1 was obtained (16:30, Feb. 2, 2010). The screen image DI3 represented by the screen image data c3 denotes a screen image displayed on the display 20 at the date and time when the differential backup data db2 was obtained (16:30, Feb. 3, 2010). The image contents of the respective screen images DI1 through DI4 are accordingly different from one another.

A3. Data Restore Process

Figure 4:
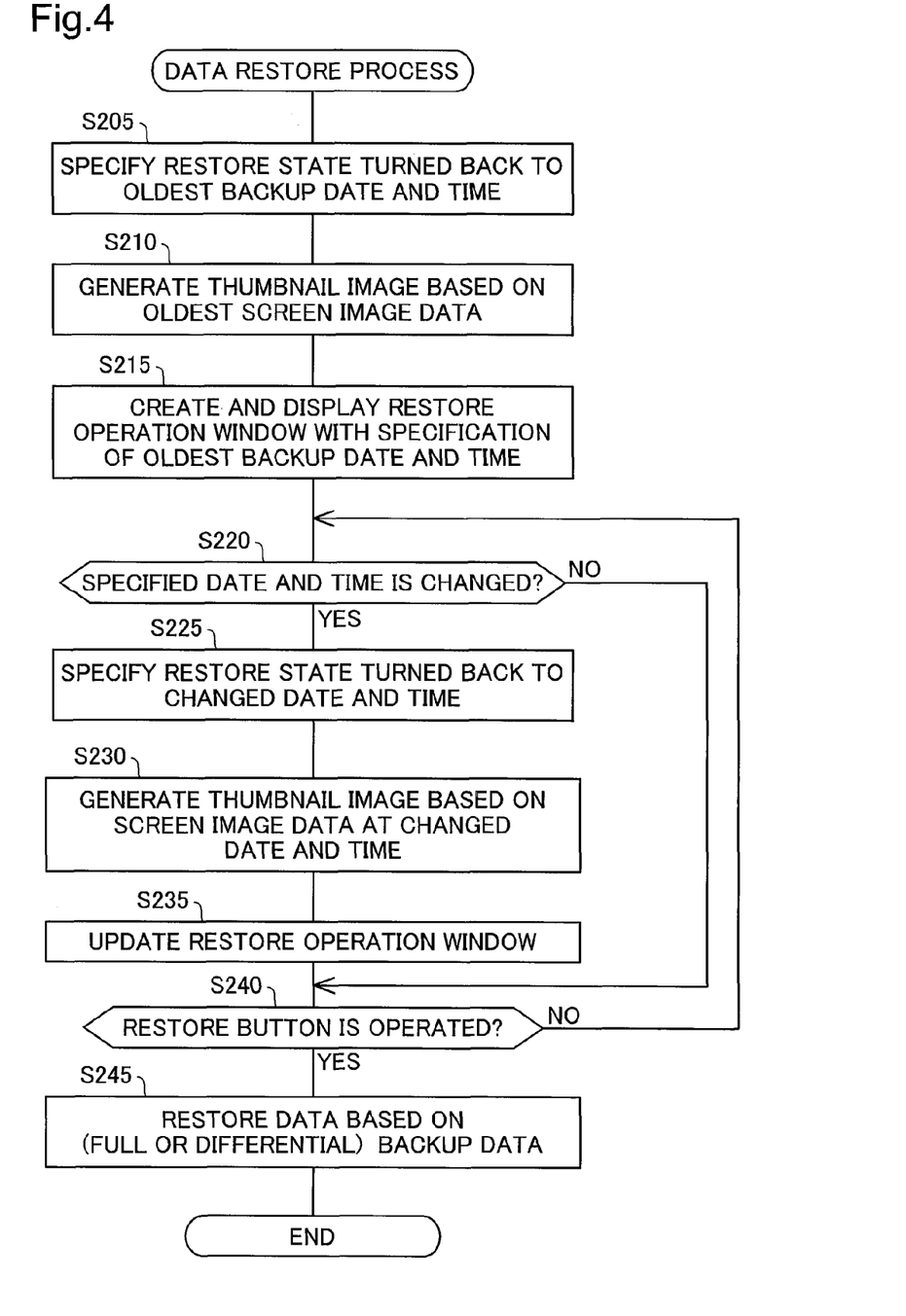
FIG. 4 is the flowchart of the data restore process performed in the computer system.

FIG. 4 is a flowchart for the data restore process performed in the computer system 100. When desiring to restore data in the HDD 12 based on the backup data stored in the external hard disk drive 50, the user operates the keyboard 21 and the mouse 22 to select a restore menu (not shown) and thereby trigger the data restore process. The data restore process is explained in detail below with reference to one example where the data restore process is started later than 16:30 on the same date after the completion of the backup process on Feb. 4, 2010.

The restore controller 11c specifies the state of the HDD 12 (file storage state or restore state) on the assumption that data are restored based on the backup data obtained at the earliest time (oldest backup data) out of the backup data stored in the external hard disk drive 50 (step S205). The restore controller 11c refers to the oldest screen image data out of the screen image data stored in the external hard disk drive 50 and generates a thumbnail image (a miniaturized versions of image) corresponding to a screen image represented by the oldest screen image data and stores the generated thumbnail image into the RAM 14 (step S210).

The restore controller 11c controls the user interface controller 11d to use the file storage state or the restore state of the HDD 12 specified in step S205 in combination with the thumbnail image generated in step S210 and thereby create a restore operation window with specification of the oldest date and time when the backup data was obtained, and subsequently controls the display controller 11e to display the created restore operation window on the display 20 (step S215).

Figure 5:
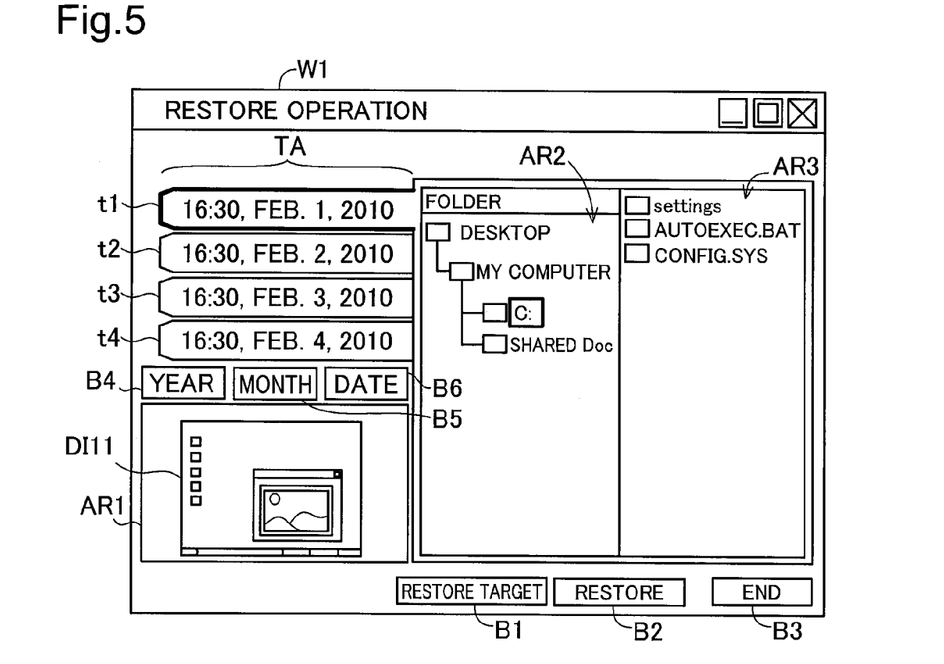
FIG. 5 illustrates one example of a restore operation window displayed on the display in step S215.

FIG. 5 illustrates one example of a restore operation window W1 displayed on the display 20 in step S215. The restore operation window W1 includes a tab display area TA, a path display area AR2, a stored data display area AR3, a thumbnail display area AR1, a restore target specifying button B1, a restore executing button B2, an end button B3, a year jump button B4, a month jump button B5, and a date jump button B6.

The tab display area TA is structured to show tabs, each representing the date and time as a candidate restore point (the date and time which the stored data is to be turned back to). The date and time as a candidate restore point means the date and time when the backup process was performed to obtain the backup data. In the state illustrated in FIG. 5, four tabs t1, t2, t3, and t4 respectively representing four different dates and times when the backup process was performed are shown in the tab display area TA.

The tab t1 shows '16:30, Feb. 1, 2010' as the oldest date and time when the backup process was performed, i.e., the oldest date and time when the backup data was obtained. Similarly the tab t2, the tab t3, and the tab t4 respectively show '16:30, Feb. 2, 2010', '16:30, Feb. 3, 2010', and '16:30, Feb. 4, 2010'. The execution date and time of the backup process shown by each of the tabs t1 through t4 is set corresponding to the name assigned to each of the folders F1 through F4 having the storage of the backup-time obtained data in the external hard disk drive 50. In the illustrated state of FIG. 5, the tab t1 encircled by a thick solid line is currently active. This means that the date and time represented by the tab t1 is specified or selected as a restore point. In the initial display state of the restore operation window W1, the tab corresponding to the oldest date and time is automatically specified as the selected restore point.

The path display area AR2 is structured to specify a restore target of backup data. The path display area AR2 displays the file storage state or the directory tree in the HDD 12 for the date and time specified by the tab currently selected in the tab display area TA. In the illustrated state of FIG. 5, the tab t1 is selected, so that the file storage state in the HDD 12 for the date and time of '16:30, Feb. 1, 2010' is shown in the path display area AR2. A path or folder encircled by a thick solid line in the path display area AR2 means that the path is specified as a restore target. In the illustrated state of FIG. 5, a path or folder having a path name of 'C:' is specified as the selected restore target. In the computer system 100, a path of a backup object is set as a default restore target.

The stored data display area AR3 is configured to show files and folders stored in the path indicated in the path display area AR2 for the date and time represented by the tab selected in the tab display area TA. In the illustrated state of FIG. 5, files or folders stored in the path having the path name of 'C:' for the date and time of '16:30, Feb. 1, 2010' are shown in the stored data display area AR3. The contents displayed in the stored data display area AR3 and in the path display area AR2 are set based on the restore state specified in step S205.

The thumbnail display area AR1 is configured to show a thumbnail image corresponding to the screen image displayed on the display 20 for the date and time or the restore point specified by the tab selected in the tab display area TA. In the illustrated state of FIG. 5, in response to the user's selection of the tab t1, a thumbnail image DI11 corresponding to the screen image displayed on the display 20 at the date and time of '16:30, Feb. 1, 2010' (i.e., the screen image DI1 shown in FIG. 3) is shown in the thumbnail display area AR1. The thumbnail image displayed in the thumbnail display area AR1 corresponds to the thumbnail image generated and stored into the RAM 14 in step S210.

The restore target specifying button B1 is operated by the user to change the specification of the restore target. In other words, the user clicks this restore target specifying button B1 to make the specification of the restore target changeable and operates the keyboard 21 and the mouse 22 to actually change the specification of the restore target to the user's desired target. The restore executing button B2 is operated to give instruction to actually restore the data.

The buttons B4 through B6 are operated to change the date and time labeled on each tab to be displayed in the tab display area TA. To be precise, in response to every click of the year jump button B4 by the user, the tab representing the date and time of the previous year when the backup process was performed is displayed in the tab display area TA. In response to every click of the month jump button B5 by the user, the tab representing the date and time of the previous month when the backup process was performed is displayed in the tab display area TA. In response to every click of the date jump button B6 by the user, the tab representing the date and time of the previous day when the backup process was performed is displayed in the tab display area TA. These buttons B4 through B6 are provided to assist the user's search for tabs representing the user's desired dates and times. For example, in the case where a certain backup schedule is set to obtain backup data every hour, a large number of backup-time obtained data (24 backup-time obtained data per day) are stored in the external hard disk drive 50, so that there are a large number of tabs to be displayed in the tab display area TA. In this case, the user is forced to select a desired tab among the large number of tabs. It may thus take the user a long time to select the desired tab. In the computer system 100, the buttons B4 through B6 are provided on the restore operation window W1. When desiring to display the tabs of the month previous to the currently displayed month, the user is simply required to click the month jump button B5 only once. The presence of these buttons B4 through B6 enable the user to search a tab representing a desired date and time within a short time period.

The restore operation window W1 of the above structure is displayed on the display 20. By simply referring to the thumbnail image DI11 currently displayed in the thumbnail display area AR1, the user is informed of the identification of the application program being executed when the correlated backup data was obtained to be usable for restoring data to the file storage state in the HDD 12 at the selected restore point or the specified date and time. In fact, the user refers to the thumbnail image DI11 to recognize the type of the operation which the user performed at the date and time specified by the selected tab (e.g., 16:30, Feb. 1, 2010). Based on the displayed thumbnail image DI11, the user may determine that, for example, 'data are to be restored to the state at the date and time when the identified operation was completed' or 'a desired file to be restored had been deleted before the identified operation was performed, so that the date and time specified for data restoration is to be changed to a previous date and time when the backup was performed before the currently displayed date and time of backup'. The user also refers to the path display area AR2 and the stored data display area AR3 and confirms in advance how the file storage state in the HDD 12 is to be restored on the assumption that data are restored based on the backup data obtained at the date and time specified by the currently selected tab.

Referring back to the flowchart of FIG. 4, after the display of the restore operation window W1 in step S215, the restore controller 11c controls the user interface controller 11d to check whether the user has changed the specified date and time as the restore point (step S220). As explained above, the user may change the tab selected to be active in the restore operation window W1 shown in FIG. 5, so as to change the restore point.

Upon determining that the user has changed the restore point (step S220: Yes), the restore controller 11c specifies the file storage state or the restore state of the HDD 12 on the assumption that data are restored based on the backup data obtained at the changed restore point or the changed date and time (step S225).

The restore controller 11c generates a thumbnail image corresponding to a screen image represented by screen image data obtained at the changed date and time or the changed restore point out of the screen image data stored in the external hard disk drive 50 and stores the generated thumbnail image into the RAM 14 (step S230).

The restore controller 11c controls the user interface controller 11d to update the restore operation window W1, based on the file storage state or the restore state of the HDD 12 specified in step S225 in combination with the thumbnail image generated in step S230 (step S235).

Figure 6:
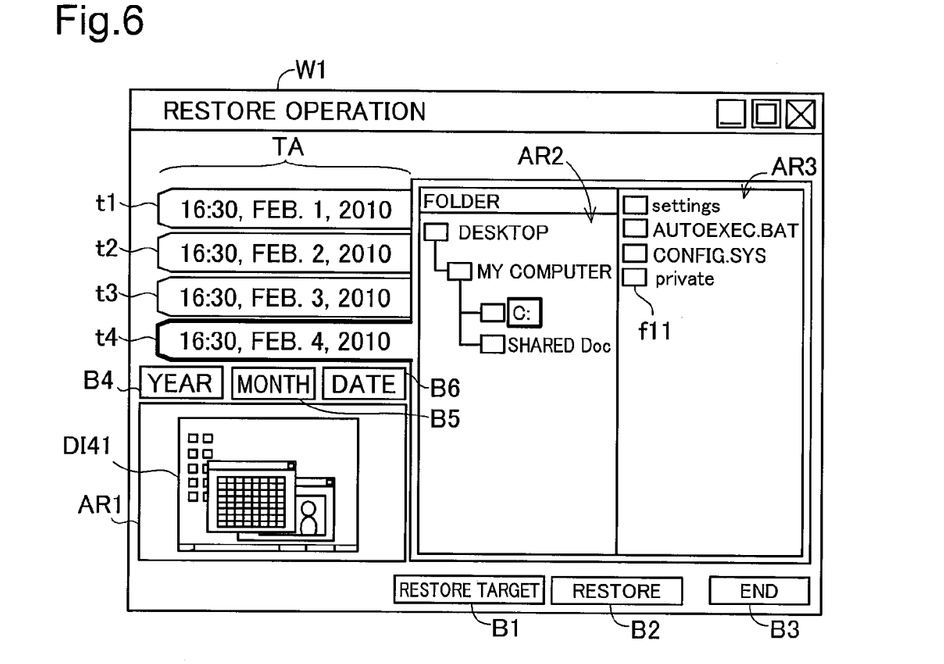
FIG. 6 illustrates one example of the restore operation window after the change of the specified date and time as the restore point.

FIG. 6 illustrates one example of the restore operation window W1 after the change of the specified date and time as the restore point. FIG. 6 shows the state of the restore operation window W1 to be displayed when the user specifies the tab t4 to change the restore point in the state of the restore operation window W1 shown in FIG. 5. A thumbnail image displayed in the thumbnail display area AR1 and files shown in the stored data display area AR3 on the restore operation window W1 shown in FIG. 6 are different from those in the restore operation window W1 shown in FIG. 5. The other displayed contents of FIG. 6 are identical with those of FIG. 5.

In the illustrated state of FIG. 6, when the user selects the tab t4, the thumbnail image DI41 corresponding to the screen image displayed on the display 20 at the new restore point or the date and time of '16:30, Feb. 4, 2010' (i.e., the screen image DI4 shown in FIG. 3) is shown in the thumbnail display area AR1, in place of the thumbnail image DI11 shown in FIG. 5. By simply referring to the thumbnail image DI41 newly displayed in the thumbnail display area AR1, the user is informed of the identification of the application program or the identification of the operation being executed when the correlated backup data was obtained to be used for restoring data to the file storage state in the HDD 12 at the changed restore point or the changed date and time.

A folder f11 having a folder name of 'private' is added to the stored data display area AR3 in the illustrated state of FIG. 6, compared with the stored data display area AR3 shown in FIG. 5. This means that the folder f11 was created in the path or folder having the path name of 'C:' at a time between 16:30, Feb. 1, 2010 and 16:30, Feb. 4, 2010. For example, when desiring to restore the folder f11 in the path or folder having the path name of 'C:', the user refers to the display contents in the stored data display area AR3 and selects the date and time of '16:30, Feb. 4, 2010' as the restore point.

Referring back to the flowchart of FIG. 4, after the update of the restore operation window W1 in step S235 or upon determining that the specified date and time or the selected restore point has not been changed by the user (step S220: No), the restore controller 11c subsequently detects the operation of the restore executing button B2 (step S240). Upon detecting no operation of the restore executing button B2 (step S240: No), the restore process returns to step S220.

When being informed of the user's click of the restore executing button B2 via the user interface controller 11d, the restore controller 11c detects the operation of the restore executing button B2 (step S240: Yes). The restore controller 11c then reads the correlated backup data obtained at the specified date and time or at the selected restore point from the external hard disk drive 50 and restores the data in the path specified in the path display area AR2 (step S245).

When the user clicks the restore executing button B2 in the illustrated state of FIG. 6 where the date and time of '16:30, Feb. 4, 2010' is selected as the restore point, the restore controller 11c reads the latest full backup data fb1 obtained before the selected restore point and the differential backup data db1, db2, and db3 obtained between the acquisition of the latest full backup data fb1 and the selected restore point and restores the data in the path having the path name of 'C:' based on the read data.

As described above, the computer system 100 of the embodiment obtains backup data together with the screen image data of desktop screen image displayed on the display 20 at the time when the backup data is obtained, and stores the backup data and the associated screen image data into the same folder in the external hard disk drive 50. This arrangement effectively enhances the discrimination of the respective backup data by utilizing screen images represented by respective correlated screen image data.

Further, a desktop screen image displayed on the display 20 at each restore point or each specified date and time is reproduced or displayed as a thumbnail image on the restore operation window W1. Such visual display enables the user to readily recall the 'application program or operation being executed when the correlated backup data was obtained. This allows the user to satisfactorily select a desired restore point by simply referring to a thumbnail image, thus effectively preventing the user from mistakenly selecting an unsuitable restore point or from consuming a long time to select a restore point.

Storing the backup data and the screen image data in the same folder correlates these data to each other. Such correlation enables the thumbnail image corresponding to the screen image displayed on the display 20 at a particular selected restore point to be displayed on the restore operation window W1 and allows the display of the thumbnail image to be changed with the change of the selection of the restore point.

The thumbnail image is displayed in the thumbnail display area AR1 provided as part of the area of the restore operation window W1. The user can thus readily specify or select a desired restore point, while referring to the display of thumbnail images. This arrangement effectively prevents the user from mistakenly selecting an unsuitable restore point or preventing a long time from being taken for selection of a desired restore point.

B. Other Aspects

Among the various constituents and components included in the embodiment of the invention discussed above, those other than the constituents and components included in the attached independent claims are additional and supplementary elements and may be omitted or combined, if necessary. The embodiment discussed above is to be considered in all aspects as illustrative and not restrictive. There may be many modifications, changes, and alterations without departing from the scope or spirit of the main characteristics of the present invention. Some examples of possible modification are given below.

B1. Modified Example 1

In the embodiment described above, backup data is obtained together with the image data of the screen image on the desktop displayed on the display 20 at the time when the backup data is obtained. This is, however, neither essential nor restrictive. For example, backup data may be obtained together with the image data of a window image generated by the application program being executed on the personal computer 10 at the time when the backup data is obtained. In another example, backup data may be obtained together with image data of an image in the partial desktop area displayed on the display 20 at the time when the backup data is obtained. In any of these modifications, the thumbnail image corresponding to the obtained image is displayed on the restore operation window W1. Any of these modified arrangements also enables the user to be informed of the identification of the application program or identification of the operation being executed when the correlated backup data was obtained, thus effectively enhancing the discrimination of the respective backup data.

In place of the image data, such as the screen image data or the image data of the application window image, another type of data may be obtained together with the backup data. For example, backup data may be obtained together with the music data reproduced on the personal computer 10 at the time when the backup data is obtained. In this modified configuration, a piece of music is reproduced or played based on the music data obtained at the time when a restore point was set. This informs the user of the identification of the piece of music being reproduced or played during acquisition of the backup data, thus enhancing the discrimination of the respective backup data. As clearly understood from the embodiment and its modified examples described above, the program of the present invention may be arranged and adapted to cause the computer to attain the function of obtaining, as identification data, an image or sound provided by another program that is different from the program of the invention and is executed by the computer during acquisition of backup data.

In another example, the name of an application program executed on the personal computer 10 during acquisition of backup data may be obtained as text data. In this modified configuration, the name of the application program, which was executed at the time when a restore point was set, is displayed on the restore operation window W1. This informs the user of the identification of the application program being executed or the identification of the operation being performed during acquisition of the backup data, thus enhancing the discrimination of the respective backup data. In a configuration where the personal computer 10 is connected with a built-in or external digital still camera, an image of the user's figure or of the display appearance on the display 20 (the display appearance of the screen image) may be taken with the digital still camera, and image data of the taken image may be stored together with backup data into the external hard disk drive 50. In this configuration, the thumbnail image corresponding to the taken image, which was displayed at the time when a restore point was set, is displayed on the restore operation window W1. This informs the user of the identification of the operation being performed or the recognition of the user's own figure, such as the clothing and the hair style, during acquisition of the backup data, thus enhancing the discrimination of the respective backup data. In general, the program of the present invention may be arranged and adapted to cause the computer to attain the function of obtaining any arbitrary data that enables the user to recall the state of the computer at the time when the backup data was obtained.

B2. Modified Example 2

In the embodiment described above, the CPU 11 executes the backup program to function as the restore controller 11c. This is, however, neither essential nor restrictive. For example, the CPU 11 may execute a restore program, which is different and separate from a backup program, to function as the restore controller 11c. When the CPU 11 executes only the backup program, a backup process is performed without data restoration. In this modified configuration, the image data of the screen image on the desktop is stored together with backup data into the same path or folder in the external hard disk drive 50. The user reproduces and displays the screen image based on the screen image data stored in the external hard disk drive 50 according to another application program different from the restore program, in order to see the screen image displayed at the time when the correlated backup data stored in the same path or folder was obtained. This enables the user to search for desired backup data without executing the restore program.

B3. Modified Example 3

In the embodiment described above, the thumbnail image is displayed on the restore operation window W1. This is, however, neither essential nor restrictive. For example, in place of a thumbnail image, information representing a storage location or path of the thumbnail image correlated to a specified restore point may be displayed on the restore operation window W1. This modified configuration enables the user to refer to the information on the storage location of each thumbnail image displayed on the restore operation window W1 and access the thumbnail image. Namely the user is able to see the thumbnail image according to another application program different from the backup program or the restore operation window W1. This arrangement does not require the generation of the thumbnail image on the restore operation window W1, thus enhancing the display response of the operation restore window W1.

In another example, in place of a thumbnail image, the restore operation window W1 may include an image display button. In response to the user's click of the image display button, a desktop screen image may be displayed over the whole display 20 for a predetermined time period, for example, 5 seconds. This modified configuration enables the user to refer to each desktop screen image displayed at the time when the correlated backup data was obtained and to select a desired restore point. This arrangement also does not require the generation of the thumbnail image on the restore operation window W1, thus enhancing the display response of the operation restore window W1.

B4. Modified Example 4

In the embodiment described above, in order to correlate the backup data with the screen image data, both the data are stored into the same path or folder in the external hard disk drive 50. This is, however, neither essential nor restrictive. For example, the backup data and the screen image data may be stored in different paths or folders, instead of being stored in the same path or folder. Data of correlating the different paths or folders for respectively storing the backup data and the screen image data therein to each other (hereafter referred to as 'correlation data') may be generated and stored in a predetermined path. In this modified configuration, a thumbnail image corresponding to a screen image correlated to each specified restore point is displayed on the restore operation window W1 by accessing the predetermined path and referring to the correlation data in the restore process. In general, the program of the present invention may be arranged and adapted to cause the computer to attain the function of correlating generated backup data to identification data, such as screen image data, and storing these correlated data into a second storage device.

B5. Modified Example 5

In the embodiment described above, the thumbnail image is generated by the restore process. The thumbnail image may alternatively be generated by the backup process. In other words, the thumbnail image is stored together with the backup data into the same folder in the external hard disk drive 50. In this modified configuration, the restore process does not require the generation of the thumbnail image. In the case of changing the specification or selection of a restore point on the restore operation window W1, the thumbnail image to be displayed in the thumbnail display area AR1 can thus be changed within a short time period. This arrangement thus enhances the display response of the restore operation window W1.

B6. Modified Example 6

In the embodiment described above, the backup-time obtained data stored in the external hard disk drive 50 includes the backup data (full backup data and differential backup data) and the screen image data. The backup-time obtained data may further include data representing a result of backup (i.e., a processing result of the backup program), in addition to these data. In this modified configuration, the result of backup (for example, successful completion or interruption) is stored together with the backup data. The user can thus properly select backup data to be used for data restoration, based on the result of backup.

B7. Modified Example 7

In the embodiment described above, the external hard disk drive 50 is equipped with the USB interface as the external interface. The external hard disk drive 50 may be equipped with any other suitable interface, in place of the USB interface. Typical examples of usable interface include various channel interfaces, such as an SCSI (Small Computer System Interface) and a Fibre Channel interface, and various network interfaces, such as an IEEE (Institute of Electrical and Electronic Engineers) 801.3 and ATM (Asynchronous Transfer Mode). The personal computer 10 is preferably equipped with any matched interface.

The storage location of the backup data is not restricted to the external hard disk drive 50 in the above embodiment but may be any storage device such as, for example, a CD drive (CD-RW: Compact Disk Rewritable), a DVD drive (DVD-RW: Digital Versatile Disk Rewritable), or a DLT (Digital Linear Tape), in place of the hard disk drive. Such an arbitrary storage device may be built in the personal computer 10. In the embodiment described above, the data stored in the internal HDD 12 of the personal computer 10 are backed up in the external hard disk drive 50. Alternatively, data stored in the external hard disk drive 50 may be backed up in the internal HDD 12. In another modification, the personal computer 10 may be equipped with another internal HDD, in addition to the internal HDD 12. Data stored in the internal HDD 12 may be backed up in the other internal HDD. In general, the program of the present invention may be arranged and adapted to back up data, which are stored in a first storage device connected with a computer, into a second storage device connected with the computer.

B8. Modified Example 8

In the embodiment described above, the backup schedule is set to obtain full backup data once every month, i.e., on the first day of each month, and differential backup data once every day other than the first day of each month. This is, however, neither essential nor restrictive. The backup schedule may be set to obtain full backup data and differential backup data at any suitable interval. The backup schedule may be set to obtain full backup data every time. Such modified configurations also enable multiple backup data to be stored in the hard disk drive 50, thereby attaining the effects of the invention.

B9. Modified Example 9

The embodiment describes the application of the program according to the present invention to the personal computer 10. This is, however, neither essential nor restrictive. For example, the program of the invention may be applied to cell-phones. In a cell-phone provided with the mail receiving and sending function and the Internet connecting function, mail data stored in the cell-phone or music data downloaded via the Internet may be backed up into a recording medium attached to the cell-phone or into a personal computer connected with the cell-phone. Such backup data may be stored together with screen image data displayed on a monitor of the cell-phone, telephone number data on the other end of the line during a telephone call, or mail address data on a mail receiver during the writing of a mail. The program of the invention may also be applied to PDAs (Personal Digital Assistants). In general, the program of the present invention may be applicable to any computer or computer-based equipment.

B10. Modified Example 10

Part of the software configuration in the above embodiment may be replaced with a hardware configuration. Part of the hardware configuration in the above embodiment may be replaced with a software configuration.

What is claimed is:

1. A computer program product for backing up data, which are stored in a first storage device connected with a computer, into a second storage device connected with the computer, the computer program product comprising:
   a computer-readable medium; and
   a computer program code stored on the computer-readable medium, wherein
   the computer is connected with a monitor device,
   the computer program code including:
      a program code for generating backup data based on at least part of the data stored in the first storage device;
      a program code for obtaining, as identification data, at least one of:
         screen image data representing an image displayed on the monitor device when the backup data is generated in the computer;
         image data of a window image generated by the application program that is different from the computer program code and is executed on the computer when the backup data is generated in the computer;
         image data that represents a user's figure or a display appearance on the display device and is taken when the backup data is generated in the computer; and
         sound data representing sounds played at the computer when the backup data is generated in the computer; and
      a program code for associating the generated backup data with the obtained identification data and storing the backup data associated with the identification data into the second storage device.

2. The computer program product in accordance with claim 1, wherein the computer program code further includes:
   a program code for providing a user interface to select backup data used for data restoration, among multiple backup data generated at different times and stored in the second storage device; and
   a program code for reproducing one of the screen image data, the image data of the window image, the image data that represents the user's figure or the display appearance, and the sound data based on the identification data associated with the backup data selected via the user interface.

3. The computer program product in accordance with claim 1, wherein
   the identification data is screen image data.

4. The computer program product in accordance with claim 3, wherein the computer program code further includes:
   a program code for generating a thumbnail image of the screen image based on the screen image data; and
   a program code for displaying the generated thumbnail image as part of the user interface on the monitor device, wherein the screen image data associated with the backup data are selected via the user interface.

5. A computer program product for backing up data, which are stored in a first storage device connected with a computer, into a second storage device connected with the computer, the computer program product comprising:
   a computer-readable medium; and
   a computer program code stored on the computer-readable medium, wherein the computer is connected with a monitor device, the computer program code including:
      a program code for generating backup data based on at least part of the data stored in the first storage device;
      a program code for obtaining, as identification data, a plurality of screen image data representing an image displayed on the monitor device when the backup data is generated in the computer, image data of a window image generated by the application program that is different from the computer program code and is executed on the computer when the backup data is generated in the computer, image data that represents a user's figure or a display appearance on the display device and is taken when the backup data is generated in the computer, and sound data representing sounds played at the computer when the backup data is generated in the computer; and
      a program code for associating the generated backup data with the obtained identification data and storing the backup data associated with the identification data into the second storage device.

6. The computer program product in accordance with claim 1, wherein the identification data is for the purpose of aiding a user to recall aspects of the backup.

7. The computer program product in accordance with claim 1, wherein
   the second storage device stores a plurality of backup data that differ from each other,
   the identification data is for the purpose of aiding a user to recall and select the correct backup data among the plurality of backup data.

8. The computer program product in accordance with claim 7, wherein
   the plurality of backup data include all the data in preset paths and differential data from a previous backup.

9. The computer program product in accordance with claim 1, wherein
   the identification data does not derive from the backup data.

* * * * *